(12) United States Patent
Williamson

(10) Patent No.: US 9,152,944 B2
(45) Date of Patent: Oct. 6, 2015

(54) GENERATING RAPIDLY ROTATABLE DIMENSIONAL VIEW OF DATA OBJECTS

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 1462 days.

(21) Appl. No.: 12/551,476

(22) Filed: Aug. 31, 2009

(65) Prior Publication Data

US 2011/0050728 A1  Mar. 3, 2011

(51) Int. Cl.
*G09G 5/00* (2006.01)
*G06Q 10/10* (2012.01)

(52) U.S. Cl.
CPC ...................................... *G06Q 10/10* (2013.01)

(58) Field of Classification Search
None
See application file for complete search history.

(56) References Cited

U.S. PATENT DOCUMENTS

| | | | |
|---|---|---|---|
| 5,491,353 A | 2/1996 | Kean | |
| 5,890,167 A | 3/1999 | Bridge, Jr. et al. | |
| 5,978,796 A | 11/1999 | Malloy et al. | |
| 6,035,300 A | 3/2000 | Cason et al. | |
| 6,360,188 B1 | 3/2002 | Freidman et al. | |
| 6,366,922 B1 | 4/2002 | Althoff | |
| 6,430,539 B1 | 8/2002 | Lazarus et al. | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,851,089 B1 | 2/2005 | Erickson et al. | |
| 6,931,418 B1 | 8/2005 | Barnes | |
| 7,039,871 B2 | 5/2006 | Cronk | |
| 7,093,194 B2 | 8/2006 | Nelson | |
| 7,139,766 B2 | 11/2006 | Thomson et al. | |
| 7,152,062 B1 | 12/2006 | Draper et al. | |
| 7,177,329 B2 | 2/2007 | Kobayashi | |
| 7,240,067 B2 | 7/2007 | Timmons | |
| 7,299,241 B2 | 11/2007 | Reed et al. | |
| 7,657,545 B2 | 2/2010 | Bird | |
| 7,660,822 B1 | 2/2010 | Pfleger | |
| 7,702,615 B1 | 4/2010 | Delurgio et al. | |

(Continued)

OTHER PUBLICATIONS

Using OLAP and Multi-Dimensional data for decision making, Hasan et al. IEEE 2001.

(Continued)

*Primary Examiner* — Scott Baderman
*Assistant Examiner* — Asher Kells
(74) *Attorney, Agent, or Firm* — Lowenstein Sandler LLP

(57) ABSTRACT

Embodiments relate to systems and methods for generating generating a rapidly rotatable dimensional view of data objects. A modeling client can host modeling logic and an application programming interface (API) to create, access, manipulate, and import/export modeling objects used in modeling applications, such as engineering, medical, financial, and other modeling platforms. The source data accepted into the modeling client can include consumer or business-level applications, whose spreadsheet, database or other content can be extracted and encapsulated in object-oriented format, such as extensible markup language (XML) format. A set of dimensions of each model object can be associated via a set of linkages. A rotator widget or other interface object can be presented to allow a user to traverse the linkages and rapidly rotate through dimensions in a view, without having to manually switch or configure planes or other database dimensions, enhancing viewing efficiency of large layers.

17 Claims, 6 Drawing Sheets

(56) References Cited

U.S. PATENT DOCUMENTS

| | | | |
|---|---|---|---|
| 7,716,257 B2 | 5/2010 | Thomson et al. | |
| 8,365,195 B2 | 1/2013 | Williamson | |
| 8,417,734 B2 | 4/2013 | Williamson | |
| 8,417,739 B2 | 4/2013 | Williamson | |
| 8,606,827 B2 | 12/2013 | Williamson | |
| 8,694,540 B1 | 4/2014 | Lin et al. | |
| 8,930,487 B2 | 1/2015 | Williamson | |
| 9,009,006 B2 | 4/2015 | Williamson | |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0070936 A1 | 6/2002 | Oikawa et al. | |
| 2002/0083034 A1 | 6/2002 | Orbanes et al. | |
| 2002/0087516 A1 | 7/2002 | Cras et al. | |
| 2002/0169658 A1 | 11/2002 | Adler | |
| 2003/0100972 A1 | 5/2003 | Andersh et al. | |
| 2003/0114950 A1 | 6/2003 | Ruth et al. | |
| 2003/0115194 A1 | 6/2003 | Pitts et al. | |
| 2003/0115207 A1 | 6/2003 | Bowman et al. | |
| 2003/0120372 A1 | 6/2003 | Ruth et al. | |
| 2003/0126114 A1 | 7/2003 | Tedesco | |
| 2003/0184585 A1 | 10/2003 | Lin et al. | |
| 2003/0225736 A1 | 12/2003 | Bakalash et al. | |
| 2004/0039736 A1 | 2/2004 | Kilmer et al. | |
| 2004/0133552 A1 | 7/2004 | Greenfield et al. | |
| 2004/0139061 A1 | 7/2004 | Colossi et al. | |
| 2004/0199497 A1 | 10/2004 | Timmons | |
| 2004/0205617 A1 | 10/2004 | Light | |
| 2004/0252136 A1 | 12/2004 | Bhatt et al. | |
| 2005/0004904 A1 | 1/2005 | Keamey et al. | |
| 2005/0010566 A1 | 1/2005 | Cushing et al. | |
| 2005/0015220 A1 | 1/2005 | Ramchandi | |
| 2005/0060252 A1 | 3/2005 | Doddington | |
| 2005/0060382 A1 | 3/2005 | Spector et al. | |
| 2005/0091206 A1 | 4/2005 | Koukerdjinian et al. | |
| 2005/0096590 A1 | 5/2005 | Gullickson et al. | |
| 2005/0102127 A1 | 5/2005 | Crowe et al. | |
| 2005/0257125 A1 | 11/2005 | Roesner et al. | |
| 2006/0004833 A1 | 1/2006 | Trivedi et al. | |
| 2006/0024653 A1 | 2/2006 | Battagin et al. | |
| 2006/0036707 A1 | 2/2006 | Singh et al. | |
| 2006/0112050 A1 | 5/2006 | Miikkulainen et al. | |
| 2006/0136462 A1 | 6/2006 | Campos et al. | |
| 2006/0173906 A1 | 8/2006 | Chu et al. | |
| 2006/0190844 A1 | 8/2006 | Binder et al. | |
| 2006/0262145 A1 | 11/2006 | Zhang et al. | |
| 2007/0006139 A1 | 1/2007 | Rubin et al. | |
| 2007/0022093 A1 | 1/2007 | Wyatt et al. | |
| 2007/0027904 A1 | 2/2007 | Chow et al. | |
| 2007/0073748 A1 | 3/2007 | Barney | |
| 2007/0088757 A1 | 4/2007 | Mullins et al. | |
| 2007/0094236 A1 | 4/2007 | Otter et al. | |
| 2007/0150820 A1 | 6/2007 | Salvo | |
| 2007/0208721 A1 | 9/2007 | Zaman et al. | |
| 2007/0211056 A1 | 9/2007 | Chakraborty et al. | |
| 2007/0256058 A1 | 11/2007 | Marfatia et al. | |
| 2007/0266308 A1* | 11/2007 | Kobylinski | 715/509 |
| 2008/0028288 A1* | 1/2008 | Vayssiere et al. | 715/219 |
| 2008/0140696 A1 | 6/2008 | Mathuria | |
| 2008/0172405 A1 | 7/2008 | Feng et al. | |
| 2008/0243778 A1 | 10/2008 | Behnen et al. | |
| 2008/0294596 A1 | 11/2008 | Xiong | |
| 2008/0320023 A1 | 12/2008 | Fong | |
| 2009/0006992 A1 | 1/2009 | Gilboa | |
| 2009/0018996 A1 | 1/2009 | Hunt et al. | |
| 2009/0172042 A1 | 7/2009 | Bracha et al. | |
| 2009/0193039 A1 | 7/2009 | Bradley et al. | |
| 2009/0222470 A1 | 9/2009 | Kemp et al. | |
| 2009/0254572 A1 | 10/2009 | Redlich et al. | |
| 2010/0057700 A1 | 3/2010 | Williamson | |
| 2010/0057777 A1 | 3/2010 | Williamson | |
| 2010/0131456 A1 | 5/2010 | Williamson | |
| 2010/0169299 A1 | 7/2010 | Pollara | |
| 2010/0180220 A1 | 7/2010 | Becerra, Jr. | |
| 2010/0305922 A1 | 12/2010 | Williamson | |
| 2010/0306254 A1 | 12/2010 | Williamson | |
| 2010/0306255 A1 | 12/2010 | Williamson | |
| 2010/0306272 A1 | 12/2010 | Williamson | |
| 2010/0306281 A1 | 12/2010 | Williamson | |
| 2010/0306340 A1 | 12/2010 | Williamson | |
| 2010/0306682 A1 | 12/2010 | Williamson | |
| 2010/0309228 A1* | 12/2010 | Mattos et al. | 345/654 |
| 2011/0050728 A1 | 3/2011 | Williamson | |
| 2011/0054854 A1 | 3/2011 | Williamson | |
| 2011/0055680 A1 | 3/2011 | Williamson | |
| 2011/0055681 A1 | 3/2011 | Smialek et al. | |
| 2011/0055761 A1 | 3/2011 | Williamson | |
| 2011/0055850 A1 | 3/2011 | Williamson | |
| 2011/0078199 A1 | 3/2011 | Williamson | |
| 2011/0078200 A1 | 3/2011 | Williamson | |
| 2011/0131176 A1 | 6/2011 | Williamson | |
| 2011/0131220 A1 | 6/2011 | Williamson | |
| 2011/0158106 A1 | 6/2011 | Williamson | |
| 2011/0161282 A1 | 6/2011 | Williamson | |
| 2011/0161374 A1 | 6/2011 | Williamson | |
| 2011/0161378 A1 | 6/2011 | Williamson | |

OTHER PUBLICATIONS

A new OLAP aggregation based on the AHC technique, Massaoud et al, DOLAP'04 Nov. 12-13, 2004.
Interactive hierarchical dimension ordering, spacing and filtering for exploration of high dimension datasets, Yang et al, IEEE symposium on information visualization 2003.
Williamson, "Systems and Methods for Interpolating Conformal Input Sets Based on a Target Output", U.S. Appl. No. 12/872,779, filed Aug. 31, 2010.
Wiiliamson, "Systems and Methods for Interpolating Alternative Input Sets Based on User-Weighted Variables", U.S. Appl. No. 12/951,881, filed Nov. 22, 2010.
Williamson, "Systems and Methods for Tracking Differential Changes in Conformal Data Input Sets", U.S. Appl. No. 12/951,937, filed Nov. 22, 2010.
Williamson, "Systems and Methods for Training a Self-Learning Network Using Interpolated Input Sets Based on a Target Output", U.S. Appl. No. 12/872,935, filed Aug. 31, 2010.
Williamson, "Systems and Methods for Embedding Interpolated Data Object in Application Data File", U.S. Appl. No. 12/955,717, filed Nov. 29, 2010.
Williamson, "Systems and Methods for Generating Interpolated Input Data Sets Using Reduced Input Source Objects", U.S. Appl. No. 12/955,768, filed Nov. 29, 2010.
Williamson, "Systems and Methods for Filtering Interpolated Input Data Based on User-Supplied or Other Approximation Constraints", U.S. Appl. No. 12/955,790, filed Nov. 29, 2010.
Williamson, "Systems and Methods for Binding Multiple Interpolated Data Objects", U.S. Appl. No. 12/955,811, filed Nov. 29, 2010.
Williamson, "Systems and Methods for Generating Portable Interpolated Data Using Object Based Encodig of Interpolated Results", U.S. Appl. No. 13/037,322, filed Feb. 28, 2011.
Williamson, "Systems and Methods for Generating Interpolation Data Template to Normalize Analytic Runs", U.S. Appl. No. 13/037,332, filed Feb. 28, 2011.
Williamson, "Systems and Methods for Generating Interpolation Data Sets Converging to Optimized Results Using Iterative Overlapping Inputs", U.S. Appl. No. 13/037,341, filed Feb. 28, 2011.
Williamson, "Systems and Methods for Validating Interpolation Results Using Monte Carlo Simulations on Interpolated Data Inputs", U.S. Appl. No. 13/037,344, filed Feb. 28, 2011.
ASPFAQ.com, "What are the valid styles for converting datetime to string?", (2006) http://database.aspfaq.com/database/what-are-the-valid-styles-for-converting-datetime-to-string.html.
Answering Joint Queries from Multiple Aggregate OLAP Databases, Pourabbas et al, LNCS 2737, pp. 24-34, 2003.
USPTO Office Action for U.S. Appl. No. 12/475,439 mailed Dec. 5, 2012.
USPTO Office Action for U.S. Appl. No. 12/475,439 mailed Feb. 22, 2012.
USPTO Office Action for U.S. Appl. No. 12/475,439 mailed Apr. 29, 2011.

(56) References Cited

OTHER PUBLICATIONS

USPTO Office Action for U.S. Appl. No. 12/475,439 mailed Nov. 10, 2010.
USPTO Office Action for U.S. Appl. No. 12/475,441 mailed May 7, 2012.
USPTO Office Action for U.S. Appl. No. 12/475,441 mailed Jul. 25, 2011.
USPTO Office Action for U.S. Appl. No. 12/475,459 mailed Feb. 28, 2012.
USPTO Office Action for U.S. Appl. No. 12/475,459 mailed Jun. 6, 2011.
USPTO Office Action for U.S. Appl. No. 12/475,460 mailed Apr. 19, 2012.
USPTO Office Action for U.S. Appl. No. 12/475,460 mailed Aug. 15, 2011.
USPTO Office Action for U.S. Appl. No. 12/475,419 mailed Nov. 28, 2012.
USPTO Office Action for U.S. Appl. No. 12/475,419 mailed Feb. 22, 2012.
USPTO Office Action for U.S. Appl. No. 12/475,458 mailed Mar. 9, 2012.
USPTO Office Action for U.S. Appl. No. 12/475,458 mailed Nov. 25, 2011.
USPTO Office Action for U.S. Appl. No. 12/475,458 mailed Jul. 5, 2011.
USPTO Notice of Allowance for U.S. Appl. No. 12/475,458 mailed Dec. 6, 2012.
USPTO Office Action for U.S. Appl. No. 12/475,452 mailed May 16, 2012.
USPTO Office Action for U.S. Appl. No. 12/475,452 mailed Aug. 12, 2011.
USPTO Office Action for U.S. Appl. No. 12/551,442 mailed Nov. 21, 2012.
USPTO Office Action for U.S. Appl. No. 12/551,428 mailed Mar. 30, 2012.
USPTO Office Action for U.S. Appl. No. 12/551,393 mailed Dec. 27, 2011.
USPTO Office Action for U.S. Appl. No. 12/551,393 mailed May 23, 2012.
USPTO Notice of Allowance for U.S. Appl. No. 12/551,393 mailed Dec. 6, 2012.
USPTO Office Action for U.S. Appl. No. 12/551,330 mailed Dec. 7, 2011.
USPTO Office Action for U.S. Appl. No. 12/551,330 mailed Jun. 13, 2012.
USPTO Office Action for U.S. Appl. No. 12/551,330 mailed Nov. 7, 2012.
USPTO Office Action for U.S. Appl. No. 12/551,330 mailed Mar. 27, 2013.
USPTO Office Action for U.S. Appl. No. 12/475,439 mailed Feb. 11, 2014.
USPTO Office Action for U.S. Appl. No. 12/475,459 mailed Apr. 4, 2014.
USPTO Office Action for U.S. Appl. No. 12/475,459 mailed Dec. 17, 2013.
USPTO Office Action for U.S. Appl. No. 12/475,459 mailed Aug. 22, 2013.
USPTO Office Action for U.S. Appl. No. 12/475,452 mailed May 13, 2013.
USPTO Office Action for U.S. Appl. No. 12/475,452 mailed Oct. 9, 2012.
USPTO Office Action for U.S. Appl. No. 12/551,476 mailed Mar. 11, 2014.
USPTO Office Action for U.S. Appl. No. 12/551,442 mailed Jun. 10, 2013.
USPTO Office Action for U.S. Appl. No. 12/551,330 mailed Sep. 17, 2013.
USPTO Office Action for U.S. Appl. No. 12/551,330 mailed Jan. 8, 2014.
USPTO Advisory Action for U.S. Appl. No. 12/475,439, mailed Jul. 21, 2011.
USPTO Notice of Allowance for U.S. Appl. No. 12/8475,441, mailed Aug. 15, 2013.
USPTO Office Action for U.S. Appl. No. 12/475,460, mailed on Apr. 22, 2014.
USPTO Office Action for U.S. Appl. No. 12/475,419, mailed on Jun. 5, 2014.
USPTO Advisory Action for U.S. Appl. No. 12/475,419, mailed on Feb. 6, 2013.
USPTO Notice of Allowance for U.S. Appl. No. 12/475,458, mailed on Dec. 6, 2012.
USPTO Advisory Action for U.S. Appl. No. 12/551,476, mailed on May 21, 2014.
USPTO Office Action for U.S. Appl. No. 12/551,442, mailed on Jun. 10, 2013.
USPTO Notice of Allowance for U.S. Appl. No. 12/551,428, mailed on Sep. 25, 2012.
USPTO Notice of Allowance for U.S. Appl. No. 12/551,393, mailed on Dec. 6, 2012.
Chandler et al., "Sharing Metadata: Building Collections and Communities", May 9, 2009, UC San Diego Libraries, pp. 1-130.
USPTO Notice of Allowance for U.S. Appl. No. 12/475,439 mailed Aug. 13, 2014.
USPTO, Final Office Action for U.S. Appl. No. 12/475,459 mailed Jul. 15, 2014.
USPTO; Office Action for U.S. Appl. No. 12/475,460 mailed Oct. 27, 2014.
USPTO; Notice of Allowance for U.S. Appl. No. 12/475,460 mailed Apr. 6, 2015.
USPTO Notice of Allowance for U.S. Appl. No. 12/475,419, mailed on Dec. 15, 2014.
USPTO Office Action for U.S. Appl. No. 12/475,452 mailed Dec. 18, 2014.
USPTO Office Action for U.S. Appl. No. 12/551,442 mailed Jan. 29, 2015.
USPTO, Office Action for U.S. Appl. No. 12/551,330 mailed Aug. 21, 2014.

* cited by examiner

GENERATING RAPIDLY ROTATABLE DIMENSIONAL VIEW OF DATA OBJECTS

FIELD

The present teachings relate to systems and methods for generating a rapidly rotatable dimensional view of data objects, and more particularly to platforms and techniques for dedicated modeling of technical, medical, financial, and other systems in which selected dimensional views of model objects can be configured and managed for rapid pivoting or rotation along desired dimensional lines.

BACKGROUND OF RELATED ART

A spectrum of modeling platforms and options exist today for engineers, managers, developers and other professionals. In the case of engineering, medical, technical, financial, and other advanced modeling resources, a range of platforms are available for users interested in setting up, running and maintaining financial modeling systems. For example, organizations interested in relatively sophisticated modeling applications, such as geophysical models for detecting oil reserves or other geologic features or equity market analysis based on Black-Sholes option pricing models, a company or other organization may choose to install advanced modeling software on mainframe-class computers to run those classes of models and obtain various projections, reports, and other results. Such mainframe platform, data center and related installations, however, can involve costs on the order of millions of dollars or more, and may require the full time attention of highly skilled professionals, including programmers and managers with advanced training. As a consequence, putting a mainframe-based modeling operation into place may not be practical or possible for many organizations or users.

On the other end of the spectrum, managers, engineers and others may employ widely available entry-level applications to capture operational data and attempt to develop predictive models for engineering, financial, medical, and other applications. That class of applications can include, for example, consumer or business-level spreadsheet, database, or data visualization programs for technical, financial, and other purposes. For instance, a manager of a manufacturing facility may use a commercially available spreadsheet application to enter production numbers, schedules, and other details of that site. However, attempting to extract useful modeling outputs from those classes of applications can be difficult or impossible. For one, spreadsheet, database, and other widely available applications are typically built to produce reports based on already existing data, but not to generate modeling outputs or objects that represent predictive outputs or scenarios. For another, existing spreadsheet, database, and other applications typically involve limitations on cell size, number of dimensions, overall storage capacity, and other program parameters which, in the case of large-scale modeling operations, may be insufficient to operate on the data sets necessary to produce and run meaningful models. For another, the data structures and outputs of existing spreadsheet, database and other entry-level or commonly available applications are typically arranged in proprietary format, rather than a widely interoperable object-based or other universal format. As still another drawback, the cells, rows, columns, and other data elements within commonly available spreadsheets, databases, and other entry-level programs cannot be extracted as separate units and exported to other modeling or analytic tools.

In further regards, conventional tools fail to permit a user to easily manipulate views of multi-dimensional data objects, such as data cubes arranged in rows, columns, and depth planes. In three-dimensional cubes or higher-order hypercubes, different the data object can be stored in a fixed or predetermined format, with defined rows, columns, and/or other dimensions in a prescribed order. A user who wishes to change the order of various dimension, pivot those dimensions from one line to another, or perform other manipulations on the source data may only be able to do so, by manually re-defining the attributes of different dimensions. Rotating or otherwise manipulating the dimensions of a large-scale data object, such as a data object representing a large-scale and/or long-running modeling operating, may therefore become cumbersome and prone to error.

In short, the use of conventional spreadsheet, database, and other consumer or business-level applications to conduct modeling operations involves significant shortcomings, due in part to the fact that those classes of platforms are not designed to reliable handle modeling functionality. At present, therefore, a manager, developer, engineer, or other professional or user with modeling requirements is faced with a choice between installing a large and expensive mainframe-based solution with its attendant infrastructure, a spreadsheet or database-based entry level solution with its attendant limitations on power and data handling, or a combination of those two types of platforms. It may be desirable to provide object-based or object-compatible modeling platforms capable of generating a rapidly rotatable dimensional view of data objects, permitting rapid pivoting, rotation, and transition of the dimensions of a model object.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
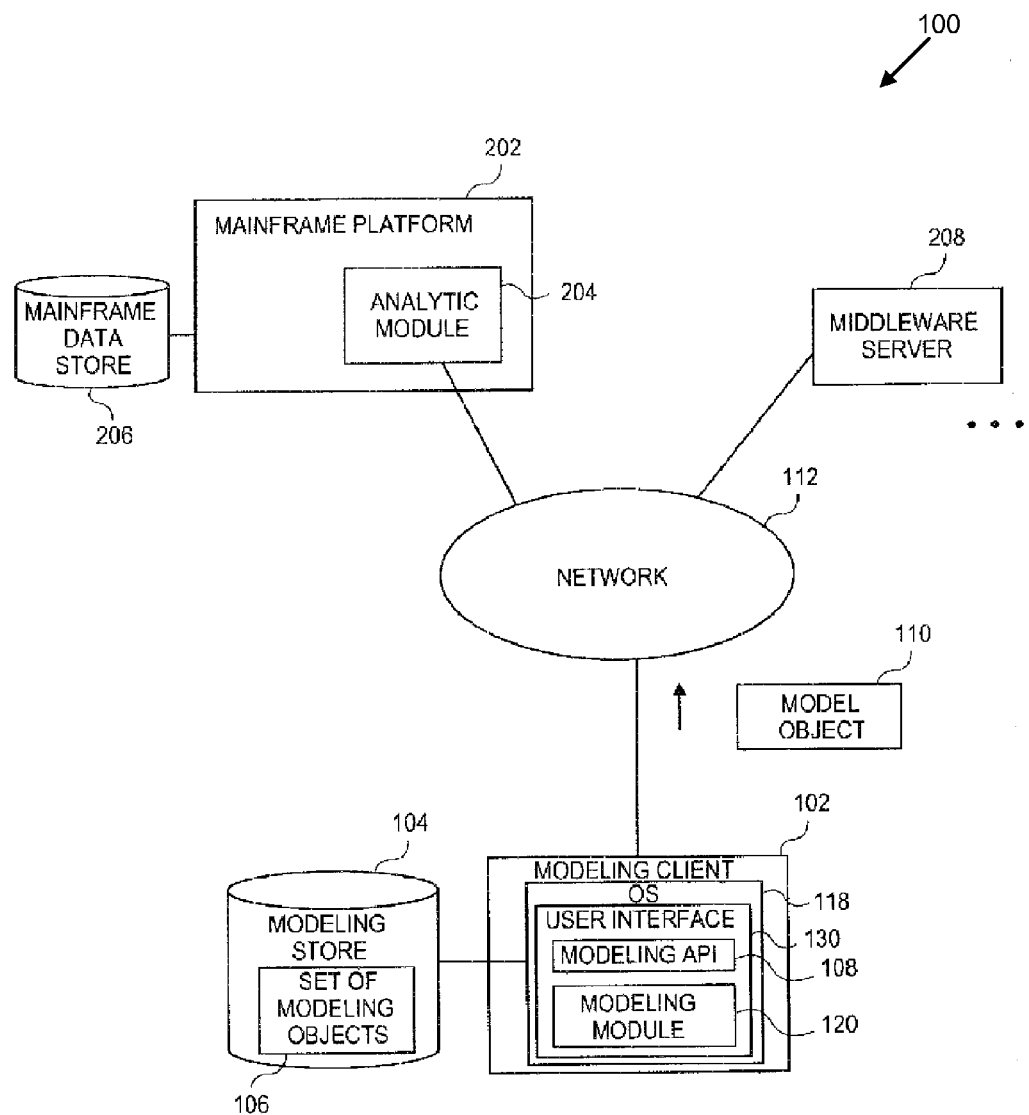
FIG. 1 illustrates an overall system for a modeling network including various hardware and connectivity resources that can be used in systems and methods for generating a rapidly rotatable dimensional view of data objects, according to various embodiments of the present teachings.

Embodiments of the present teachings relate to systems and methods for generating a rapidly rotatable dimensional view of data objects. More particularly, embodiments relate to platforms and techniques that can access, extract, and generate views of modeling objects in a native object-based or object-compatible format. The modeling objects produced via a modeling client or other modeling tool according to the present teachings can encapsulate both source data describing a physical, medical, technical, financial, or other process or phenomena, and modeling attributes that relate the source data to predictive scenarios, specific models, and other features. In embodiments, the modeling objects can be extracted or "lifted" from data sources such as database programs or others, and stored to local storage of a local modeling client.

The resulting set or sets of model objects can incorporate model objects having multiple dimensions, such as two-dimensional tables or three-dimensional cubes, each row, column, plane, or other section of which can represent one dimension of data, such as, for instance, sales figures for a month or year, production output for a given period, and/or various other kinds or types of data. In aspects, a modeling module can access a set of model objects. The modeling module and/or other software or logic can present those objects to a user in a regular or baseline view, such as a view of data arranged in a cube with defined dimensions along the rows, columns, and planes of that object. In normal operation, the user may manually select different dimensions to view or manipulate, for example by highlighting or selecting a row of the data object. According to various embodiments, the modeling module and/or other logic can generate a set of dimension linkages, not present in the original data representation or structure, which provide a link or connection between different dimensions in the model object or objects.

According to embodiments, the modeling module and/or other logic can generate a rotator widget, such as a graphical wheel or other object, which activates the set of dimension linkages. A rotational view which permits rapid pivoting, progression, rotation or other movement through various dimensions of the model object(s) can be generated by traversing the set of dimension linkages, thereby permitting a user to rapidly and conveniently view a sequence or series of dimensions in the model object, without a need to separately select that sequence of dimensions using manual selections. These and other embodiments described herein address the various noted shortcomings in known modeling technology, and provide a user or operator with enhanced modeling power on a desktop or other client, allowing rapid pivoting, rotation, and/or other movement or transitions through dimensions of data objects. Systems and methods according to the present teachings also allow seamless generation, local storage, and communication of model objects and associated data to back-end mainframe platforms, data centers, middleware servers, other modeling clients, and/or other local or remote modeling, storage, or data processing resources.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall network 100 in which systems and methods for generating a rapidly rotatable dimensional view of data objects can be implemented, consistent with various embodiments of the present teachings. In embodiments as shown, a modeling client 102 can communicate with a variety of local and remote resources, including a mainframe platform 202 via one or more network 112. Client 102 can be or include, for instance, a personal computer, a server, a dedicated workstation, a mobile device, or other machine, device, hardware, or resource. One or more network 112 can be or include, for example, the Internet, a virtual private network (VPN), a local area network such as an Ethernet™ network, or other public or private network or networks. Mainframe platform 202 can be or include commercially available platforms or installations, such as, merely for example, mainframe or enterprise platforms available from SAP Inc. of Walldorf, Germany, and other sources.

Mainframe platform 202 can include modules, logic, and functionality to perform an array of computation and data storage tasks, including data warehousing, data mining, statistical analyses, financial planning, inventory management, customer resource management, engineering design, and other applications. In implementations as shown, mainframe platform 202 can host or communicate with a variety or resources including, merely illustratively, a mainframe data store 206, and logic or applications including an analytic module 204. Mainframe platform 202 can contain, host, support, or interface to other data processing hardware, software, and other resources. In embodiments, modeling client 102 can likewise communicate with other local or remote resources, such as a middleware server 208 hosting or interfacing to a set of data stores for online analytical processing (OLAP) or other functions. Modeling client 102 can also communicate or interface with other local or remote servers, services, data stores, or other resources.

In embodiments as shown, modeling client 102 can operate under an operating system 118, such as a distribution of the Linux™, Unix™, or other open source or proprietary operating system. Modeling client 102 can present a user interface 130, such as a graphical user interface or command line interface, operating under operating system 118 to receive commands and inputs from a user, and operate modeling client 102. Modeling client 102 can communicate with storage resources including a modeling store 104, such as a local or remote database or data store. Modeling store 104 can store a set of modeling objects 106, in which data, functions, procedures, attributes, and/or other information related to one or more modeling object 110 can be encapsulated and stored. In embodiments, modeling object 110 can be encoded in extensible markup language (XML) format. In embodiments, modeling object 110 can be encoded in other object-based or object-compatible formats or data structures. Modeling client 102 can communicate with mainframe platform 202 via a modeling application programming interface (API) 108. Modeling application programming interface (API) 108 can include, for instance, defined function calls or calls to other routines, calculations, or features, as well as data structures and parameters associated with modeling operations. For example, modeling application programming interface (API) 108 can include a function call to invoke a Monte Carlo simulation model based on a set of supplied data, such as an identified set of dimensions extracted from a spreadsheet or database. Other functions, routines, resources, and features can be called, invoked, or instantiated via modeling application programming interface (API) 108. According to embodiments in various regards, one or more local or remote modeling packages, modules, or other supporting applications can be instantiated via modeling module 120 and modeling application programming interface (API) 108 to manipulate source data and resulting one or more modeling object 110.

In embodiments, a user of modeling client 102 can access, modify, or add data modeling objects to a set of data modeling objects 106 via a modeling module 120 hosted in modeling client 102. Set of data modeling objects 106 can include data objects that the user of modeling client 102 has directly entered, or, in aspects, which the user of modeling client has imported or extracted from sources such as consumer or business-level spreadsheet, database, and/or other applications or platforms. Modeling module 120 can itself be or include applications, software modules or hardware modules, or other logic or resources to operate on set of modeling objects 106. Modeling module 120 can, merely illustratively, include or access logic or modules for invoking and manipulating a variety of scientific, technical, engineering, medical, financial, manufacturing, or other modeling operations. For instance, modeling module 120 can be or include applications or logic for performing Monte Carlo simulations, finite element analyses, Black-Scholes option pricing or other market analyses, epidemiological projections, geophysical models or simulations, or other simulations, models, trend mappings, projections, or other predictive processes. In embodiments in one regard, after invoking modeling module 120 and performing any modeling task, the user of modeling client 102 can locally store and/or export one or more modeling object 110 to external platforms or resources.

In embodiments as shown, the user of modeling client 102 can for instance export or communicate one or more modeling object 110 to mainframe platform 202 via modeling application programming interface (API) 108, for storage and use at a local or remote location from within that platform. In aspects, mainframe platform 202 can receive modeling object 110 directly, without a necessity for translation, re-formatting, or invoking any spreadsheet, database, or other application from which data encapsulated in one or mode modeling object 110 originated. In aspects, mainframe platform 202 can operate on one or more modeling object 110, and transmit or return that data or other results to modeling client 102 via modeling application programming interface (API) 108. Thus, according to aspects of the present teachings, modeling objects can be exchanged directly and programmatically between modeling client 102, mainframe platform 202 or other larger-scale or remote platforms, including for instance middleware server 208 or other comparatively large-scale or higher-capacity modeling or analytic tools.

Figure 2:
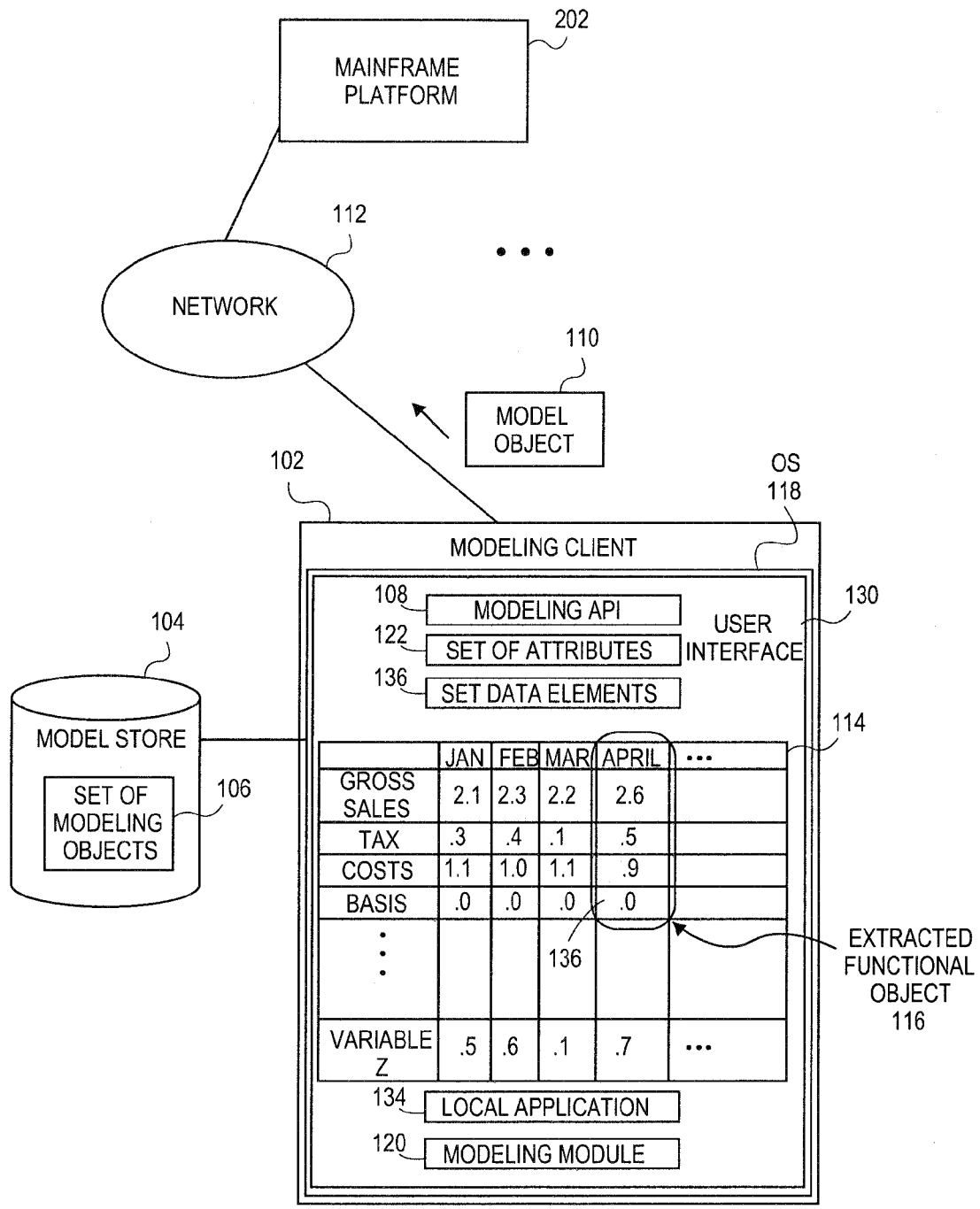
FIG. 2 illustrates an exemplary modeling network including a modeling server and connectivity resources, according to various embodiments.

In terms of operating on source data and generating one or more modeling object 110 for local storage and/or exchange with mainframe platform 202 or other platforms, and as shown for instance in FIG. 2, according to various embodiments, a user of modeling client 102 can invoke modeling module 120 to manipulate a set of source data 114 to identify, configure, and/or extract the functional objects, attributes, or other features of a set of data to produce a modeling output. In embodiments as shown, modeling module 120 can access a set of source data 114, from which data, attributes, and/or other metadata can be extracted to generate one or more modeling object 110. In aspects, set of source data 114 can be generated, hosted, or stored by or in a local application 134, such as a spreadsheet, database, accounting, word processing, presentation, or other application or software. In aspects, set of source data 114 can comprise data previously or newly generated in the form of an object-based modeling object, such as a modeling object entered, imported, or specified by the user of modeling client 102. In aspects, set of source data 114 can comprise data originally stored or generated in a consumer or business-level spreadsheet, database, and/or other application or software. In aspects, set of source data 114 can be initially formatted or encoded in a non-object oriented format, such as in a cellular array or in a relational database format. In aspects, set of source data 114 can be initially formatted or encoded in an object-oriented format, such as extensible markup language (XML) format. In aspects, a user of modeling client 102 can highlight, select, or otherwise specify all or a portion of set of source data 114 to generate one or more extracted functional object 116. For instance, a user can highlight a column of set of source data 114 to identify and extract data as well as functional relationships of interest, to the user, as a unified object. Thus, purely illustratively and as shown, a user may wish to obtain a view on a current month's sales figures including gross sales, tax, production or delivery costs, and cost basis, as well as other parameters related to sales activity. In aspects as shown, a user can, for instance, highlight those functional relationships by dragging a cursor or otherwise selecting a set of cells to group together, and form one or more extracted functional object 116. In aspects, selection can include the extraction of set of data elements 136, such as values stored in spreadsheet cells or database entries. In aspects, once a set of data elements 136 are selected, the functional, computational, or other modeling parameters associated with that data cane be stored or associated with one or more extracted functional object 116. For instance, modeling module 120 can store associated routines, computations, processes, or other attributes or functional specifications for one or more extracted functional object 116 in set of attributes 122, which can be stored or associated with one or more extracted functional object 116. In aspects, set of attributes 122 can include the identification of or linkage to any routines, interfaces, or other functional or computational resources that will be associated with one or more extracted functional object. According to various embodiments, analytic module 204 of mainframe platform 202, or other resource or platform receiving one or more extracted functional object 116 from modeling client 102 can thereby obtain both data values derived or obtained from set of source data 114, as well as functional or procedural resources and relationships associated with that data. One or more extracted functional object 116 along with any associated set of attributes 122 can be encoded or stored in one or more modeling object 110, which can thereby be transparently exported to mainframe platform 202, middleware server 208, or other platforms or destinations for further modeling operations.

Figure 3:
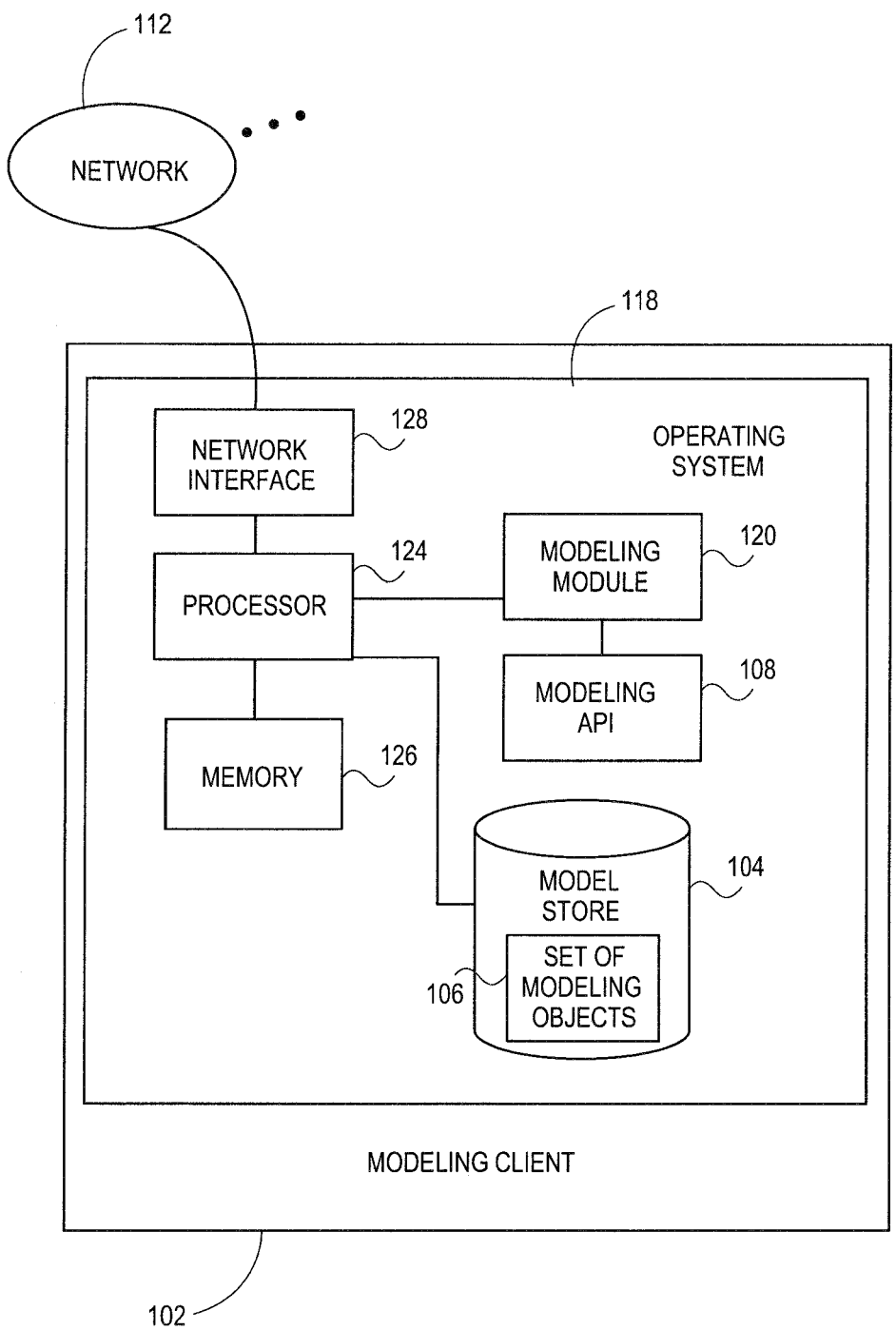
FIG. 3 illustrates an exemplary hardware configuration for a modeling server that can be used in systems and methods for generating rapidly rotatable dimensional view of data objects, according to various embodiments.

FIG. 3 illustrates an exemplary diagram of hardware, software, connectivity, and other resources that can be incorporated in a modeling client 102 configured to communicate with one or more network 112, including to interface with mainframe platform 202, middleware server 208, and/or other local or remote resources. In embodiments as shown, modeling client 102 can comprise a processor 124 communicating with memory 126, such as electronic random access memory, operating under control of or in conjunction with operating system 118. Operating system 118 can be, for example, a distribution of the Linux™ operating system, the Unix™ operating system, or other open-source or proprietary operating system or platform. Processor 124 also communicates with a model store 104, such as a database stored on a local hard drive, which may store or host set of modeling objects 106. Processor 124 further communicates with network interface 128, such as an Ethernet or wireless data connection, which in turn communicates with one or more networks 112, such as the Internet, or other public or private networks. Processor 124 also communicates with modeling module 120 along with modeling application programming interface (API) 108 and/or other resources or logic, to execute control and perform modeling calculation, translation, data exchange, view generation, dimensional manipulations, and other processes described herein. Other configurations of the network modeling client 102, associated network connections, and other hardware and software resources are possible. While FIG. 3 illustrates modeling client 102 as a standalone system comprises a combination of hardware and software, modeling client 102 can also be implemented as a software application or program capable of being executed by a conventional computer platform. Likewise, modeling client 102 can also be implemented as a software module or program module capable of being incorporated in other software applications and programs. In either case, modeling client 102 can be implemented in any type of conventional proprietary or open-source computer language.

Figure 4:
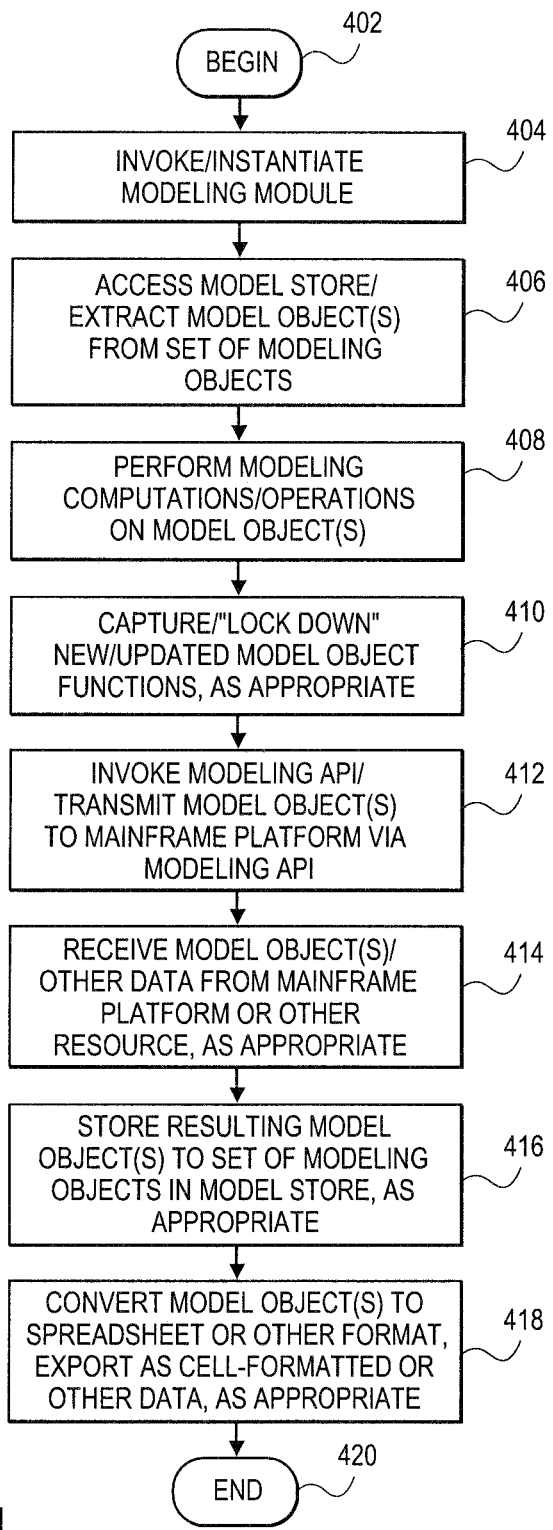
FIG. 4 illustrates a flow diagram of overall modeling processing for object-based modeling that can be used in systems and methods for generating a rapidly rotatable dimensional view of data objects, according to various embodiments.

FIG. 4 illustrates a flow diagram of overall processing that can be used in general systems and methods for generating a rapidly rotatable dimensional view of data objects, according to various embodiments. In 402, processing can begin. In 404, a user of modeling client 102 or other client or device can invoke or instantiate modeling module 120 or other logic, to perform modeling operations. In 406, modeling module 120 can access model store 104 and extract one or more modeling object 110 from set of modeling objects 106. In 408, modeling computations or other operations can be performed on one or more modeling object 110. For example, a modeling operation can be performed to project or predict the output of a factory based on various supply scenarios for parts, materials, energy costs, or other variables. In 410, the values, functions, linkages, or other attributes of one or more data modeling object 110 that were accessed, produced, or modified by the modeling operations can be captured, fixed, or locked down by modeling module 120. For instance, the resulting one or more modeling object 110 can be stored to set of modeling objects 106 in model store 104, or other databases or data stores.

In 412, modeling application programming interface (API) 108 can be invoked by modeling module 120, by mainframe platform 202, or other resources to transfer one or mode modeling object 110 to mainframe platform 202. In embodiments, one or more modeling object 110 can for instance be communicated to mainframe platform 202 via a secure connection or channel, such as a secure socket layer (SSL) connection, via a channel encrypted using a public/private key infrastructure, or other channel or connection. In 414, one or more model object 110 can be received in modeling module 120 from mainframe platform 202 or other resource, as appropriate. For example, an updated version of one or more model object 110 reflecting new data, new modeling results, or other information can be received in modeling module 120. In 416, the resulting new, updated, or modified one or more model object 110 can be stored to set of modeling objects 106 in model store 104, as appropriate. In embodiments, one or more model objects 110 can in addition or instead be stored to mainframe data store 206, to middleware server 208, to another modeling client or other client, or other site or destination. In 418, modeling module 120 can convert one or more model objects 110 to spreadsheet, database, or other format, and export any converted data as a set of cell-formatted information, or data encoded in other formats. For instance, modeling module 120 can convert or translate one or more model objects to cell data values or database entries, and export that data to client-level applications on modeling client 102 or other local or remote devices or storage. In 420, processing can repeat, return to a prior processing point, jump to a further processing point, or end.

Figure 5:
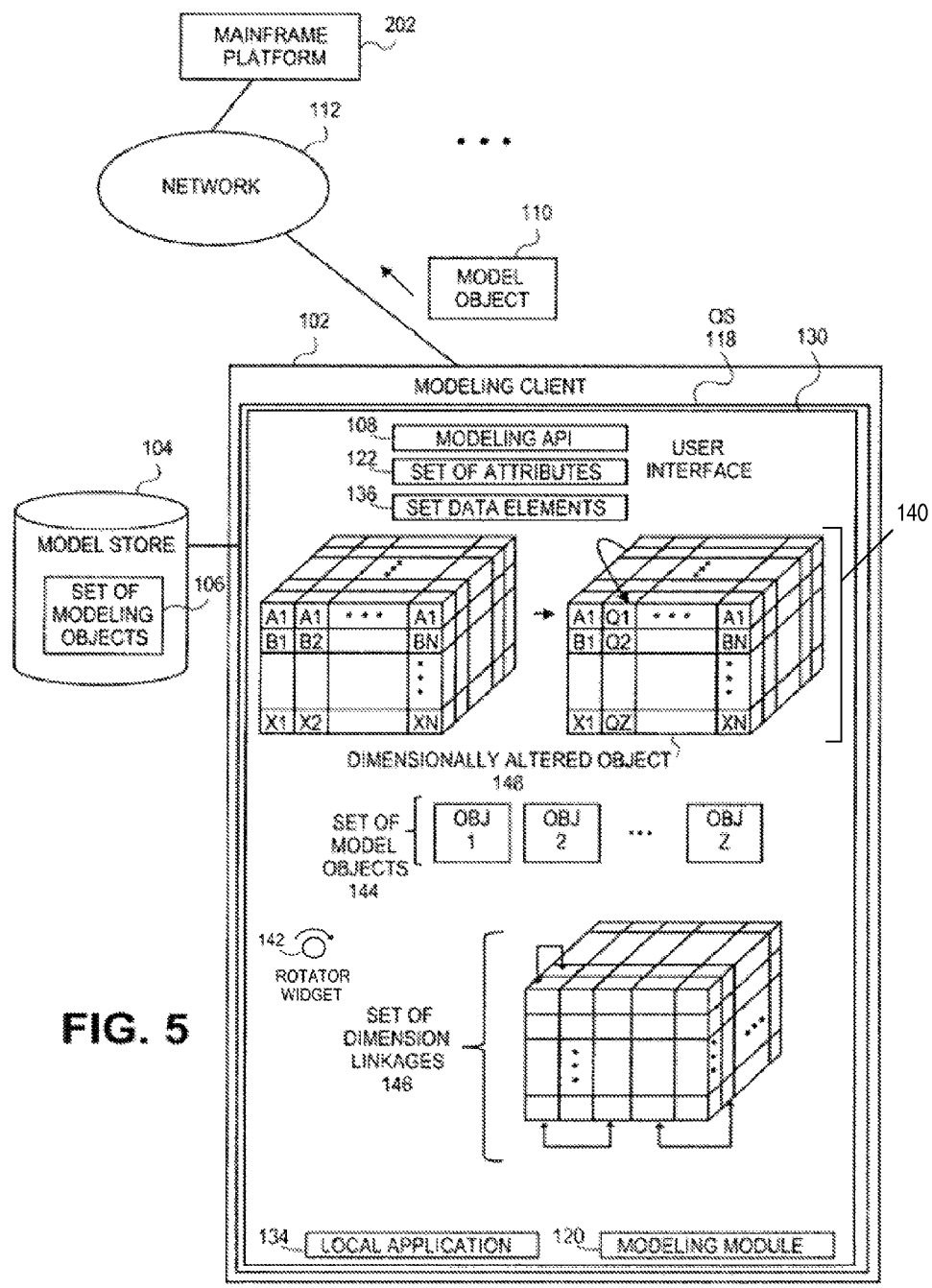
FIG. 5 illustrates exemplary operations to generate a set of pivoted or rotated dimensional views of a model object, according to various embodiments.

According to various embodiments of the present teachings, and as for example generally illustrated in FIG. 5, in implementations modeling module 120 can generate or access a set of model objects 144, for instance using techniques described herein, each of which objects can contain or comprise a set of dimensions 140. More particularly, in aspects as shown, a set of model objects 144 can be generated or accessed via modeling client 102, each of which objects can be or include an object generally similar to model object 110 as described herein. In aspects, the set of dimensions 140 can be or include dimensions in a two-dimensional data table and/or three-dimensional data cube, in which rows, columns, and/or places of those objects represent independent data dimensions, each with associated attributes. In embodiments as shown, modeling module 120 and/or other logic can generate a set of dimension linkages 146 representing linkages between two or more dimensions in a data object in set of model objects 144. For example, set of dimension linkages 146 can link a first column C1 in a database with a dimension C2, and/or other dimensions. In embodiments, multiple linkages between one dimension and another group of dimensions can be established.

In embodiments, modeling module 120 and/or other logic can likewise generate and present a rotator widget 142 to permit the user to control the navigation and views of set of dimensions 140. In embodiments, in addition to or instead of modeling module 120, a separate view management module or other additional logic can be used to control views on the objects, layers, and related data, for instance in conjunction with user interface 130 and/or operating system 118. In embodiments, rotator widget 142 can be a rotatable widget or gadget that can, for instance, be rotated via a mouse wheel or other input. Upon selection and manipulation of rotator widget 142, such as forward rotation of rotator widget 142, a next successive or other dimensions in set of dimensions 140 can be presented to the user via user interface 130. Further selection or rotation of rotator widget 142 can cause one or more further dimensions to appear or change locations or configurations, in an updated view.

In embodiments, the speed of presentation of successive views of set of dimensions 140 and related data can be controlled by the rate at which rotator widget 142 is rotated or otherwise manipulated. In embodiments, after reaching a final dimension in set of dimensions 140, a return to the first or original dimensions in set of dimensions 140 can be automatically generated. In embodiments, a direction of pivoting or rotation can be controlled by rotating, pointing, or moving rotator widget 142 in different directions. In embodiments, rotator widget 142 can be configured to permit rotation of views through dimensions in different directions or dimensions, for example, by assigning quadrants to a pointer associated with rotator widget 142 and initiating different sequences of views based on selected quadrants. Other selections, views, pivots, rotations or other rotations or manipulations of set of dimensions 140 can be performed. In aspects, one or more dimensions can be deleted or removed from the set of dimensions 140 of a model object. In aspects of the present teachings, large-scale modeling dimensional objects and other data structures can thereby be navigated in a relatively rapid and convenient fashion.

Figure 6:
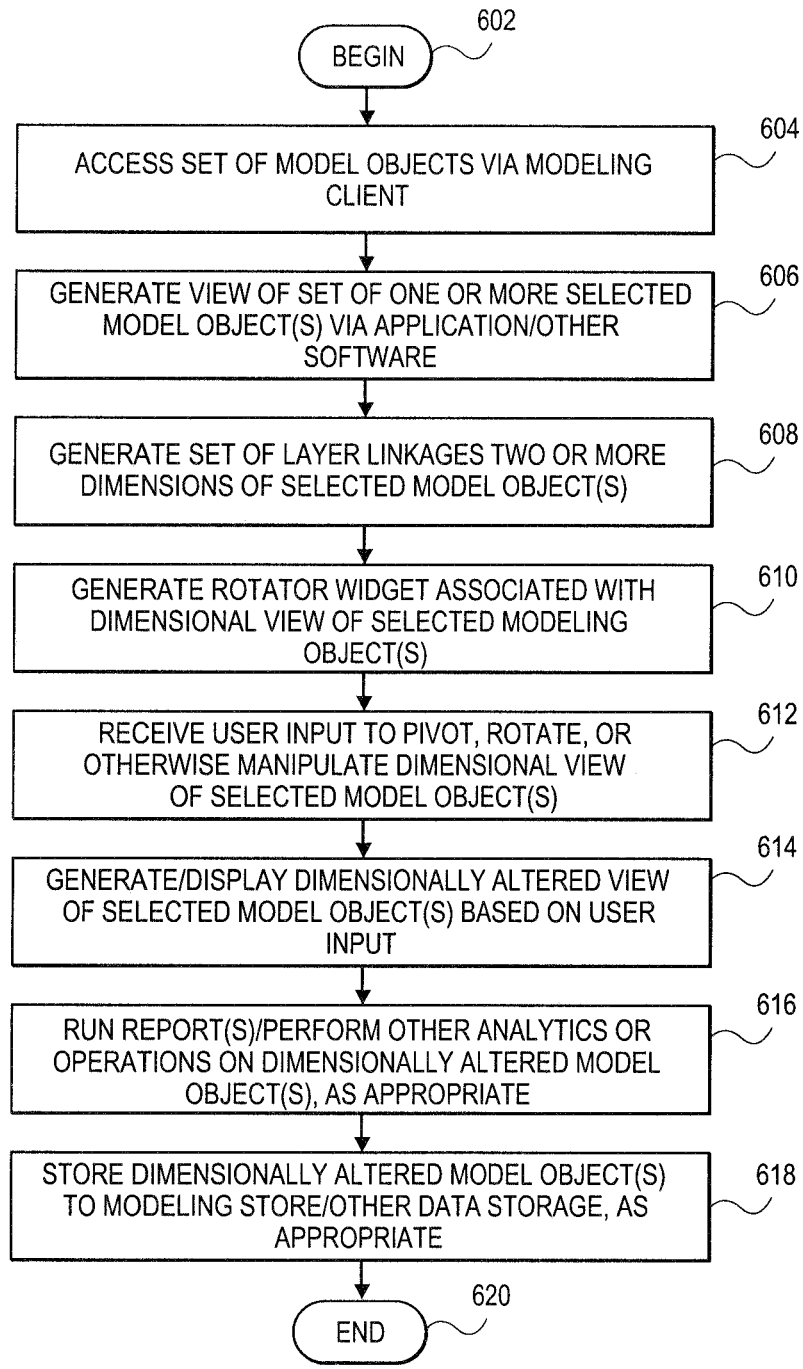
FIG. 6 illustrates a flow diagram of processing to generate a rapidly rotatable dimensional view of data objects, according to various embodiments.

FIG. 6 illustrates a flow diagram of overall processing to generate a rapidly rotatable dimensional view of data objects, according to various embodiments. In 602, processing can begin. In 604, a user can invoke or initiate modeling module 120 and/or local application 134, such as, for instance, a spreadsheet application, a database application or other applications or software and access set of model objects 144. In 606, a view of one or more model objects selected from the set of model objects 144 can be generated, for instance via a local application 134. In embodiments, the view can consist of a dimensional view representation of one or more selected model objects, for example, depicting a two-dimensional table having rows and columns containing data dimensions, and/or a three-dimensional cube having rows, columns, and planes containing data dimensions. In 608, a set of dimension linkages 146 can be generated or accessed via modeling module 120 and/or other logic. For instance, a linkage between successive rows, successive columns, rows with columns in defined mappings, or and/or other relationships can be defined. In embodiments, the mapping or relationship can be automatically generated, and/or can be partially or fully specified by user input.

In 610, modeling module 120 and/or other logic can generate one or more rotator widget 142 associated with the view of the set of dimensions 140 of set of model objects 144. In embodiments, rotator widget 142 can comprise a graphical gadget, widget, icon, and/or other graphical interface object that can indicate a rotational operation on or navigation through the view of set of dimensions 140, such as a rotatable wheel that can be rotated by a mouse wheel, tab key, and/or other user input. In 612, modeling module 120 and/or other logic can receive user input to pivot, rotate, exchange, or otherwise alter or manipulate the view of the set of dimensions 140 of set of model objects 144, such as, for instance, a mouse wheel input to rotate rotator widget 142 by ninety degrees, or other input or data. In 614, modeling module 120 and/or other resources, such as operating system 118, user interface 130, or other resources, can generate and display one or more dimensionally altered model object 148 including a rotated or altered view of set of dimensions 140 of the selected model object(s). Dimensionally altered model object 148 can include, for instance, rows or columns which have been exchanged or pivoted with other rows or columns in the source object. In embodiments, the display of dimensionally altered model object 148 including rotated views can be generated by following set of dimension linkages 146, and displaying a next specified dimension in the set of dimension linkages 146. In embodiments, a next specified dimension in set of dimension linkages 146 can be stored in a memory or video memory cache, to facilitate rapid rotation or transition to an altered or next dimensional view.

In 616, modeling module 120 and/or other logic may run a report and/or perform other analytics or operations on the dimensionally altered model object(s) 148, as appropriate. For instance, a user may selected to run a summation on an altered row, column, or other dimension. In 618, the dimensionally altered model object(s) 148 can be stored to modeling store 104 and/or other data storage, as appropriate. In 620, processing can repeat, return to a prior processing point, jump to a further processing point, or end.

The foregoing description is illustrative, and variations in configuration and implementation may occur to persons skilled in the art. For example, while embodiments have been described wherein one or more model object 110 is accessed and manipulated via one modeling client 102, in embodiments, one or more users can use multiple modeling clients, or networks including modeling clients or other resources, to operate on model object data. For additional example, while embodiments have been described in which rotator widget 142 and related logic can operate on object-based data stores, in embodiments, rotator widget 142 can operate on data stores or structures that are not object-based. For further example, while embodiments have been described in which modeling client 102 may interact with one mainframe platform 102 and/or one middleware server 208, in embodiments, one or more modeling client 102 can interact with multiple mainframe platforms, data centers, middleware servers, and/or other resources, in various combinations. Yet further, while embodiments have been described in which a modeling client 102 interacts with a mainframe platform 102 and/or middleware server 208, in embodiments, rather than interact with large-scale mainframe platforms, data centers, or middleware servers, modeling client 102 can interact with other local or remote modeling clients, networks of those clients, or, in embodiments, can operate to perform modeling operations on a stand-alone basis, without necessarily communicating with other modeling platforms. Still further, while embodiments have been described in which a view of one set of model objects 144 are controlled via one rotator widget 142, in embodiments, more than one rotator widget, for example with one widget controlling one dimension, a second widget controlling rotation in a second dimension, and so forth, can be used. Conversely in embodiments, one or more rotator widget 142 can control a view or views on multiple sets of model objects and associated object dimensions or layers. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
identifying a first model object comprising one or more rows and one or more columns and a second model object comprising one or more rows and one or more columns, wherein a modeling application performs an operation on data in at least one of the first model object or the second model object to predict an output;
generating, by a processor, at least one linkage in view of user input specifying the at least one linkage between at least one of a row or a column in the first model object and at least one of a row or a column in the second model object, wherein the at least one linkage specifies a plurality of successive rows or columns linked between the first model object and the second model object;
generating a dimensional view of the first model object and the second model object in a user interface (UI), the dimensional view comprising the one or more rows and one or more columns of the first model object linked to the one or more rows and one or more columns of the second model object as specified by the at least one linkage;
generating a rotator widget to change the dimensional view using the at least one linkage specifying the plurality of successive rows or columns linked between the first model object and the second model object;
receiving input via the rotator widget rotating the rotator widget; and
altering the dimensional view in view of the input to display a next specified row or column as specified by the at least one linkage.

2. The method of claim 1, wherein the dimensional view of the first model object and the second model object is pivoted on at least one row or at least one column.

3. The method of claim 1, wherein altering the dimensional view comprises:
removing at least one of a row or a column.

4. The method of claim 1, wherein the rotator widget comprises a view transition icon.

5. The method of claim 4, wherein the view transition icon is controllable via a cursor on the user interface.

6. The method of claim 5, wherein the dimensional view comprises a plurality of dimensional views, and wherein repeated activation of the view transition icon generates a return to a first dimensional view in the plurality of dimensional views after display of a last dimensional view in the plurality of dimensional views.

7. The method of claim 1, wherein the rotator widget is embeddable in source data.

8. The method of claim 1, further comprising:
storing the dimensional view separately from the first model object and the second model object.

9. A client system comprising:
an interface to a first model object comprising one or more rows and one or more columns and a second model object comprising one or more rows and one or more columns, wherein a modeling application performs an operation on data in at least one of the first model object or the second model object to predict an output; and
a processing device coupled to the interface to
generate at least one linkage in view of user input specifying the at least one linkage between at least one of a row or a column in the first model object and at least one of a row or a column in the second model object, wherein the at least one linkage specifies a plurality of successive rows or columns linked between the first model object and the second model object;
generate a dimensional view of the first model object and the second model object in a user interface (UI), the dimensional view comprising the one or more rows and one or more columns of the first model object linked to the one or more rows and one or more columns of the second model object as specified by the at least one linkage,
generate a rotator widget to change the dimensional view using the at least one linkage specifying the plurality of successive rows or columns linked between the first model object and the second model object;
receive input via the rotator widget rotating the rotator widget, and
alter the dimensional view in view of the input to display a next specified row or column as specified by the at least one linkage.

10. The system of claim 9, wherein the dimensional view of the first model object and the second model object is pivoted on at least one row or at least one column.

11. The system of claim 9, wherein to alter the dimensional view comprises the processing device to:
remove at least one of a row or a column.

12. The system of claim 9, wherein the rotator widget comprises a view transition icon.

13. The system of claim 12, wherein the view transition icon is controllable via a cursor on the user interface.

14. The system of claim 13, wherein the dimensional view comprises a plurality of dimensional views, and wherein repeated activation of the view transition icon generates a return to a first dimensional view in the plurality of dimensional views after display of a last dimensional view in the plurality of dimensional views.

15. The system of claim 9, wherein the rotator widget is embeddable in source data.

16. The system of claim 9, further comprising:
a memory coupled to the processing device to store the dimensional view separately from the first model object and the second model object.

17. A non-transitory computer readable storage medium storing a set of computer readable instructions thereon that, in response to execution by a processor, cause the processor to:
identify a first model object comprising one or more rows and one or more columns and a second model object comprising one or more rows and one or more columns, wherein a modeling application performs an operation on data in at least one of the first model object or the second model object to predict an output;
generate, by the processor, at least one linkage in view of user input specifying the at least one linkage between at least one of a row or a column in the first model object and at least one of a row or a column in the second model object, wherein the at least one linkage specifies a plurality of successive rows or columns linked between the first model object and the second model object;
generate a dimensional view of the first model object and the second model object in a user interface (UI), the dimensional view comprising the one or more rows and one or more columns of the first model object linked to the one or more rows and one or more columns of the second model object as specified by the at least one linkage;
generate a rotator widget to change the dimensional view using the at least one linkage specifying the plurality of successive rows or columns linked between the first model object and the second model object;
alter the dimensional view of the data of the second model object that is linked to the dimensional view of the data of the first model object; and
rotating the representation in the UI from the dimensional view in view of the data of the input to display a next specified row or column as specified by the at least one linkage.

* * * * *